United States Patent
Jin

(10) Patent No.: US 8,346,963 B2
(45) Date of Patent: *Jan. 1, 2013

(54) METHOD FOR SENDING AND RECEIVING PERSONAL INFORMATION BY USING MOBILE TERMINAL

(75) Inventor: Chae Hee Jin, Inchon-shi (KR)

(73) Assignee: LG Electronics Inc., Seoul (KR)

( * ) Notice: Subject to any disclaimer, the term of this patent is extended or adjusted under 35 U.S.C. 154(b) by 10 days.

This patent is subject to a terminal disclaimer.

(21) Appl. No.: 13/072,154

(22) Filed: Mar. 25, 2011

(65) Prior Publication Data

US 2011/0171981 A1 Jul. 14, 2011

Related U.S. Application Data

(63) Continuation of application No. 11/439,169, filed on May 24, 2006, now Pat. No. 7,925,779, which is a continuation of application No. 09/735,532, filed on Dec. 14, 2000, now Pat. No. 7,058,686.

(30) Foreign Application Priority Data

Dec. 14, 1999 (KR) .................................. 99-57564

(51) Int. Cl.
*G06F 15/173* (2006.01)
*G06F 15/16* (2006.01)
(52) U.S. Cl. ......................... 709/238; 709/245
(58) Field of Classification Search .................. 709/204, 709/206, 238, 245
See application file for complete search history.

(56) References Cited

U.S. PATENT DOCUMENTS

| | | |
|---|---|---|
| 5,794,142 A | 8/1998 | Vanttila et al. |
| 5,920,826 A | 7/1999 | Metso et al. |
| 6,084,951 A | 7/2000 | Smith et al. |
| 6,175,741 B1 | 1/2001 | Alperovich |
| 6,212,412 B1 | 4/2001 | Rogers et al. |
| 6,226,367 B1 | 5/2001 | Smith et al. |
| 6,292,669 B1 | 9/2001 | Meuronen et al. |
| 6,370,389 B1 | 4/2002 | Isomursu et al. |
| 6,411,822 B1 | 6/2002 | Kraft |
| 6,473,622 B1 | 10/2002 | Meuronen |
| 6,519,470 B1 | 2/2003 | Rydbeck |
| 6,563,494 B1 | 5/2003 | Eichstaedt et al. |
| 6,606,486 B1 | 8/2003 | Cubbage et al. |
| 6,625,283 B1 | 9/2003 | Sato |

(Continued)

FOREIGN PATENT DOCUMENTS

JP 08-329017 12/1996

(Continued)

OTHER PUBLICATIONS

US Office Action for U.S. Appl. No. 11/439,169 dated Oct. 2, 2008.

(Continued)

*Primary Examiner* — Kristie Shingles
(74) *Attorney, Agent, or Firm* — KED & Associates, LLP

(57) ABSTRACT

A system for sending and receiving personal information using a mobile terminal is disclosed. In the present invention, a personal information is sent using a short message service with an attached identification information. Accordingly, when the short message is received by a receiving mobile terminal, the attached identification information allows the receiving mobile terminal to distinguish and process the short message for personal information differently from other general short messages.

17 Claims, 5 Drawing Sheets

U.S. PATENT DOCUMENTS

| | | | |
|---|---|---|---|
| 6,690,931 B2 | 2/2004 | Heo | |
| 6,795,711 B1 | 9/2004 | Sivula | |
| 6,826,407 B1 | 11/2004 | Helferich | |
| 6,959,193 B1 | 10/2005 | Kim | |
| 7,054,621 B2 | 5/2006 | Kennedy | |
| 7,058,686 B2 * | 6/2006 | Jin | 709/206 |
| 7,187,932 B1 | 3/2007 | Barchi | |
| 7,409,224 B1 | 8/2008 | Lemke et al. | |
| 7,426,264 B1 | 9/2008 | Henderson | |
| 7,613,472 B2 | 11/2009 | Northcutt | |
| 7,925,779 B2 * | 4/2011 | Jin | 709/238 |
| 2003/0236769 A1 | 12/2003 | Pyhalammi | |
| 2004/0128151 A1 | 7/2004 | Mock et al. | |
| 2004/0203598 A1 | 10/2004 | Aerrabotu et al. | |
| 2004/0203956 A1 | 10/2004 | Tsampalis | |

FOREIGN PATENT DOCUMENTS

| | | |
|---|---|---|
| KR | 1999-60754 | 7/1999 |
| WO | WO 9929127 A1 | 6/1999 |

OTHER PUBLICATIONS

US Office Action for U.S. Appl. No. 11/439,169 dated Apr. 24, 2009.
US Office Action for U.S. Appl. No. 11/439,169 dated Sep. 18, 2009.
US Office Action for U.S. Appl. No. 11/439,169 dated Jun. 3, 2010.

* cited by examiner

FIG. 4A

```
1. Personal information setting
2. Personal information transmission
next                          confirm
```

FIG. 4B

```
Personal information name setting
        Hong Gil Dong
next                          confirm
```

FIG. 4C

```
Personal telephone number setting
019-123-1234
next                          confirm
```

FIG. 4D

```
1. Personal information setting
2. Personal information transmission
next                          confirm
```

FIG. 4E

Receiver telephone number input
019-123-4567

| next | | confirm |

FIG. 4F

Transmission complete

| next | | confirm |

FIG. 5

Arrival of Hong Gil Dong's information

| cancel | | save |

METHOD FOR SENDING AND RECEIVING PERSONAL INFORMATION BY USING MOBILE TERMINAL

CROSS-REFERENCE TO RELATED APPLICATION(S)

This application is a Continuation Application of application Ser. No. 11/439,169 filed May 24, 2006 now U.S. Pat. No. 7,925,779, which is a Continuation Application of application Ser. No. 09/735,532 filed Dec. 14, 2000 now U.S. Pat. No. 7,058,686 which claims priority under 35 U.S.C. §119 to Korean Application No. 1999-57564 filed on Dec. 14, 1999, whose entire disclosure(s) is/are hereby incorporated by reference.

BACKGROUND OF THE INVENTION

1. Field of the Invention

The invention relates to a mobile terminal, and in particular, to a method of sending and receiving information using a mobile terminal.

2. Discussion of the Related Art

A mobile telecommunication system generally comprises mobile terminals, a base transceiver station (BTS), a base station controller (BSC), and mobile switching centers (MSC). The BTS converts the signal format between the mobile terminals and the BTS for wire and wireless link. The BSC connects each component of the BTS to a cell operator, manages the BTS operation, manages service status of hardwares and softwares in the BTS, allocates resources related to call traffic, collects information for the BTS operation, and monitors sub-devices related to monitoring and anchoring of the BTS. The MSC is the connection point for the BSC management and for user traffic between a mobile telecommunication network and a wire telephone network or between two BTSs of the same mobile telecommunication system.

Recently, mobile telephones can be used to receive AM or FM radio broadcastings or to store and playback MP3 music downloaded in audio file formats from the internet. In addition, mobile telephones can be used for phone number storage, schedule management, and personal information management. Moreover, the latest models allow more items to be input and stored to allow management of more information.

FIG. 1 is a block diagram showing the internal structure of a mobile terminal in the related art. Referring to FIG. 1, a typical mobile terminal includes a Radio Frequency/Intermediate Frequency (RF/IF) processing unit 100 for receiving and converting the frequency of RF signals to downlink signals; a modulator/demodulator (M/DM) 101 for demodulating the converted RF signals from the RF/IF processing unit 100 or for modulating input digital voice signals; a data compression unit 102 for compressing the input digital voice signals; a Coder/Decoder (CODEC) 105 for converting the digital signals received by the RF/IF processing unit 100 into voice signals or for converting voice signals input through a microphone 111 into digital signals; and a DTMF generator 104 for generating Dual Tone Multi Frequency (DTMF) produced when a key button is entered.

The mobile terminal of FIG. 1 further includes a main processor 103 for executing call processing protocol to control the overall system of the mobile terminal and to connect a call; an audio amplifier 106 for amplifying analogue signals input from the CODEC 105 or microphone 111; a speaker 110; a liquid cell display window 107 for outputting the states of the mobile terminal; a memory 108 for storing variables used in programs and in the main processor 103, and storing information such as phone numbers; and a key pad 109 for receiving user inputs.

The operations of the mobile terminal in sending or receiving voice data is as follows. When sending voice data, a user inputs a voice signal after manipulating the mobile terminal to connect a call with another user terminal. The microphone 111 converts the input voice signal into an electrical signal and transmits the electrical signal to the CODEC 105. The CODEC 105 samples and converts the analog voice signal transmitted electrically from the microphone 111 to a Pulse Code Modulation (PCM) signal and transmits the PCM signal to the data compression unit 102. The data compression unit 102 then compresses the PCM signal transmitted from the CODEC 105.

Thereafter, the main processor 103 executes spreading of the compressed PCM signal by multiplication with a Pseudo Noise (PN) code, and the M/DM 101 modulates the spread PCM signal for radio transmission. The RF/IF processing unit 100 converts the modulated voice signal output by the M/DM 101 from an intermediate frequency to a radio frequency and transmits the converted signal through an antenna.

The receiving operation is a reverse of the sending operation and a detailed explanation will be omitted. Briefly, a radio signal is received through the antenna, converted to an intermediate frequency by the RF/IF processing unit 100, demodulated by the M/DM 101, despread by the main processor 103, expanded and converted into a voice signal to be output through the speaker 110.

In sending/receiving personal information using a mobile terminal described as above, there have been problems. First, if a mobile terminal user wishes to send personal information to another mobile terminal during a call to the another mobile terminal, the mobile terminal user must send the personal information by voice through a speech channel. Similarly, when receiving personal information during a call, a mobile terminal user must make note of the personal information received by voice, and then manually input and store the information in the mobile terminal after terminating the call. Also, if a business card is exchanged, a mobile terminal user who receives the personal information on the business card must manually input and store the personal information in the mobile terminal, causing inconvenience.

Second, a message including personal information can be sent/received by a short message service. However, the receiving mobile terminal recognizes such personal message as merely a short message and therefore, a user of the receiving mobile terminal must manually confirm and store the received personal information in the phone number list of the mobile terminal. For example, if the SMS includes a name "John" and phone number "019-123-4567," the user must confirm receipt and manually input each character J, o, h, n and numbers 0, 1, 9, 1, 2, 3, 4, 5, 6, 7 into the phone number list of the mobile terminal. When such personal information is sent to a numberous number of mobile terminals, each user of the receiving mobile terminal must store the received personal information, causing great inconvenience.

SUMMARY OF THE INVENTION

Accordingly, an object of the present invention is to solve at least the problems and disadvantages of the related art.

Particularly, an object of the present invention is to provide a more efficient method of sending and/or receiving personal information through mobile terminals.

Another object of the present invention is to provide a more efficient method of sending/receiving personal information through mobile terminals using a short message service.

A further object of the present invention is to provide a method of quickly sending/receiving personal information through mobile terminals using a short message service by attaching an extension.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of sending personal information through a mobile terminal comprises (a) setting the mobile terminal to a personal information sending mode; (b) inputting personal information data for transmission; (c) inputting phone number(s) of receiving mobile terminal(s) for receiving the personal information data; and (d) sending the input personal information data to the receiving mobile terminal(s) using a Short Message Service (SMS).

A method of receiving personal information through a mobile terminal according to the present invention comprises (a) detecting if a received short message has a personal information data transmission; (b) selecting whether to store the received short message when the short message is for personal information data transmission; and (c) storing the received short message according to the result of the selection in (b).

BRIEF DESCRIPTION OF THE DRAWING

The invention will be described in detail with reference to the following drawings in which like reference numerals refer to like elements wherein:

FIG. 4a.about.4f show characters displayed in a liquid crystal display window of a mobile terminal in personal information sending mode using a mobile terminal in accordance with the present invention;

FIG. 5 shows characters displayed in a liquid crystal display window of a mobile terminal in personal information receiving mode using a mobile terminal in accordance with the present invention.

DETAILED DESCRIPTION OF THE INVENTION

Reference will now be made in detail to the present invention, examples of which are illustrated in the accompanying drawings.

Generally, the present system allows sending/receiving personal information through a mobile terminal. The personal information may be information such as the mobile terminal user's name, telephone number, home address, business, business address, and email address. In the present invention, a mobile terminal inputs identification information of the user into a short message and sent to a receiving terminal by a short message service.

Such system of sending/receiving personal information through a mobile terminal can be divided into two procedures. Namely, a first procedure or method for sending personal information includes inputting the personal information into a mobile terminal and transmitting the personal information to a receiving mobile terminal. The second procedure or method is for receiving personal information. The personal information transmitting and receiving procedures will be described in detail below.

Figure 1:
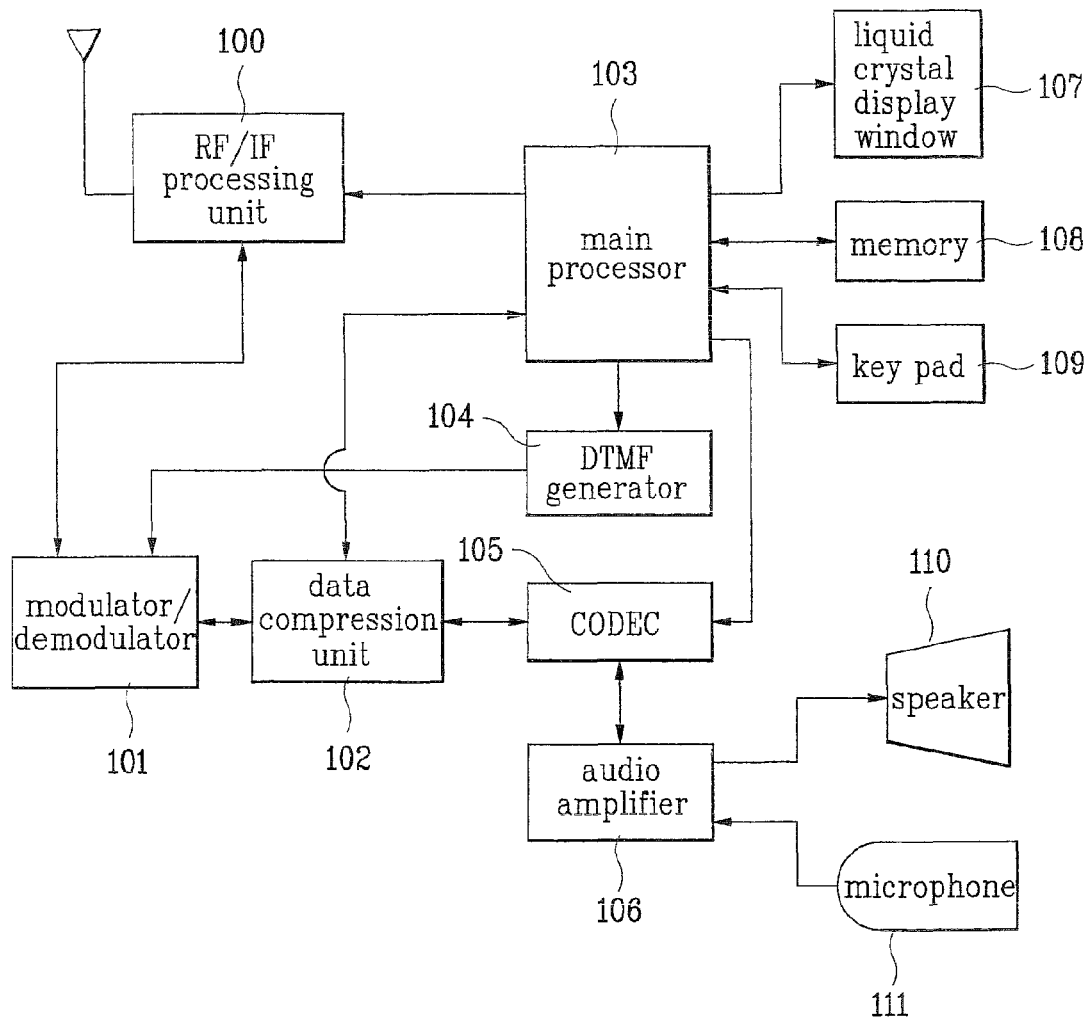
FIG. 1 is a block diagram showing a mobile terminal in the related art.
Figure 2:
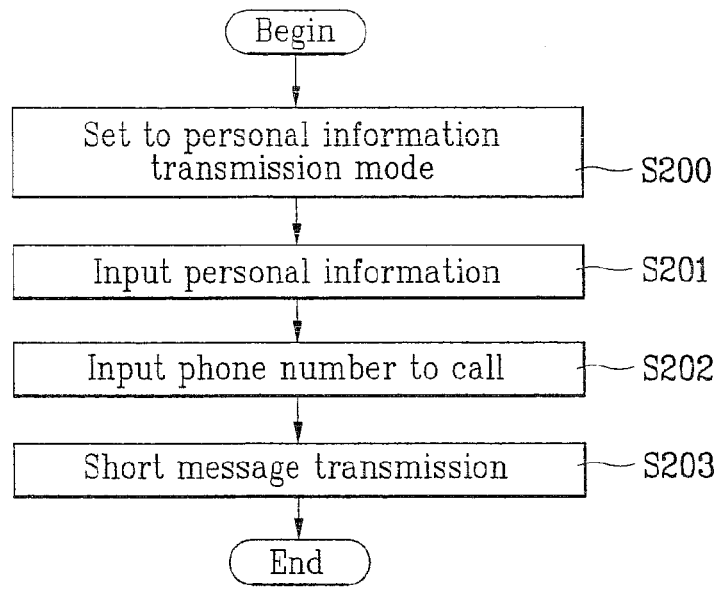
FIG. 2 is a flowchart of a personal information sending method using a mobile terminal according to the present invention.

FIG. 2 is a flowchart of a personal information sending method using a mobile terminal according to the present invention. Referring to FIG. 2, a mobile terminal user first manipulates menu button(s) on the mobile terminal to set the mode of the mobile terminal to a personal information transmission mode (S200). In the personal transmission mode, the user inputs user's personal information to be transmitted to a receiving mobile terminal (S201). Here, the user may input personal information including but not limited to user name, home phone number, mobile terminal number, home address, business address, and email address. Alternatively, the personal information can be stored in advance in the mobile terminal and read when necessary for transmission.

Subsequently, the user inputs the phone number of the receiving mobile terminal to which the user wants to transmit the personal information (S202). In this time, the user can choose several other mobile terminals inputting several phone numbers that the user wants to designate as receiving mobile terminals. Here, the user can either input the phone number manually or automatically from a phone number list stored in the mobile terminal. Finally, the mobile terminal transmits the personal information of the user to the receiving mobile terminal or terminals when the user enters a command, for example, by pushing a send button (S203).

In the above procedure, the mobile terminal generates the personal information of the user into a short message and transmits the personal information according to a procedure for SMS. However, an additional identification information is inserted into the short message for personal information transmission. The additional identification information differentiates the short message for personal information transmission from other short messages. Therefore, receiving mobile terminals) can distinguish the use of short messages according to the identification information.

Although the identification information can be inserted into any available data field for the short message, the first portion of the user data field for short messages preferably includes a personal information identifier field "//piid" into which the identification information is inserted.

Figure 3:
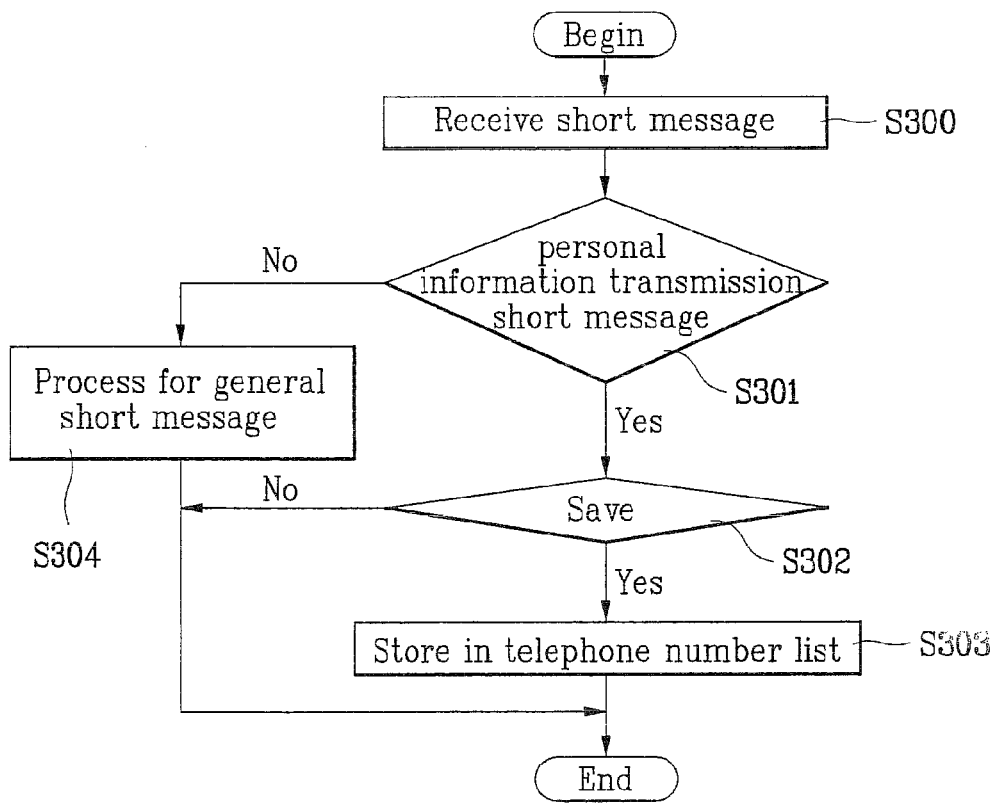
FIG. 3 is a flowchart of a personal information receiving method using a mobile terminal according to the present invention.

The personal information receiving procedures will next be described. FIG. 3 is a flowchart of a personal information receiving method using a mobile terminal according to the present invention.

Referring to FIG. 3, upon receiving a short message (S300), a receiving mobile terminal first determines if the received short message is for personal information transmission (S301). Namely, the receiving mobile terminal determines whether the short message is for personal information transmission by checking if the short message has an "//piid" field, i.e. the identification information.

If the received short message is for personal information transmission, the receiving mobile terminal displays the received short message on the liquid crystal display window. Here, the mobile terminal can display the received short message and also generate a tone to indicate the receipt of a short message using a speaker or a buzzer. Thereafter, the user of the receiving mobile terminal can determine whether to store the message displayed on the liquid crystal display window (S302). When the user enters a command to save the short message, for example, by pushing a 'save' button on the key pad of the mobile terminal, the mobile terminal automatically stores the personal information transmitted by the short message into a storage unit for storing telephone number list (S303). However, if the user decides not to store the received short message, the user can either do nothing or enter a command such as pushing a 'cancel' or 'delete' button to cancel the received short message, depending upon the model of the receiving mobile terminal.

If the received short message is not for personal information transmission, the mobile terminal processes the received short message according to the procedure for processing a general short messages (S304).

The SMS is an additional service which allows transmission of information related to various available services or information on daily life, by text, through a the liquid crystal display window of mobile terminals. Using the SMS in connection with tools of a Code Division Multiple Access (CDMA) system network such as a MSC, home network location register (HLR), voice mail system/fax mail system (VMS/FMS), interactive voice response (IVR), and short message entity (SME), a mobile telecommunication subscriber or user can send/receive short messages in text form.

Particularly, when transmitting a short message using the CDMA network, the short message is transmitted from a mobile terminal to a MSC through a base station which includes a BTS and a BSC. The MSC transmits the short message to an SMS center and the SMS center stores the transmitted short message to a database connected to the SMS center. The SMS center then attempts to transmit the short message to a receiving MSC connected with a receiving base station which serves a receiving mobile terminal. Here, the receiving mobile terminal is located using the HLR of the mobile station. Thus, the SMS center transmits the short message to the receiving base station through the receiving MSC, and the receiving base station transmits the short message to the receiving mobile terminal. Subsequently, the SMS center reports the result of the short message transmission to the sending mobile terminal which sent the short message. In the above process, the short message can be transmitted to the receiving mobile terminal through an access channel or a paging channel as well as a traffic channel.

FIG. 4a.about.4f show text displayed in a liquid crystal display window of a mobile terminal in personal information transmission mode in accordance to the present invention. As shown in FIG. 4a, when a user manipulates the menu of the mobile terminal and selects the personal information menu, the liquid crystal display window displays menu items such as "1. Personal Information Setting Menu" by which personal information can be set and "2. Personal Information Transmission Menu" by which personal information can be transmitted. If the user selects the menu item to set personal information, the liquid crystal display window of the mobile terminal will display text related to the personal information.

Namely, as shown in FIG. 4C, "Personal Information Name Setting" mode can be displayed, by which a name can be entered. Here, other items not shown in the figures can also be made to be displayed such as "Personal Information Address" mode by which address(es) of, for example, business, home and email can be entered; "Personal Information Telephone Number" mode by which phone number(s) of, for example, business, home, mobile terminal such as PCS, DCN, facsimile can be entered; and "Business Name" mode by which business name can be entered.

Upon entering a name, the user can set and store the name by entering an appropriate command. In the example illustrated by FIG. 4A, the command is a "confirm" icon displayed on the liquid crystal display window. Subsequently, the user may input a command to set other information. In the above example, the command is a "next" icon displayed on the liquid crystal display window. Although the example allows the user to enter commands through the display, the commands may be entered through other methods such as menu keys on the mobile terminal.

If the user inputs a command to set other information, a "Personal Telephone Number Setting" mode, by which the phone number can be entered, may next be displayed as shown in FIG. 4C. As in the name setting, the telephone number can be set and stored by entering the appropriate commands. Upon setting the phone number, other menu items may be displayed and set. When the last menu item is displayed and/or set, the "1. Personal Information Setting" mode is complete and the liquid crystal display window of the mobile terminal displays again the menu items in a previous level, i.e. "1. Personal Information Setting" mode and "2. Personal Information Transmission" mode as shown in FIG. 4D.

If the user selects the menu item to transmit a personal information, i.e. "2. Personal Information Transmission" mode, the liquid crystal display window of the mobile terminal would display text related to transmission of the personal information such as "Receiver Number Input" mode as shown in FIG. 4E, by which a phone number of receiving mobile terminal(s) can be entered. Accordingly, after the user inputs the telephone number of a receiving mobile terminal and enters a command to send the personal information by, for example, pushing "Send (or Speak)" button of the keypad of the mobile terminal, the liquid crystal display window of the mobile terminal displays a text as shown in FIG. 4F indicating that the transmission of the personal information is complete.

In the above transmission, the personal information may be sent using the SMS as described above. Namely, a "personal information identifier" is inserted or attached to the first portion of the user data field for SMS service, thereby distinguishing a SMS for personal information transmission from other general SMS messages. The SMS data field will later be explained in more detail with reference to FIG. 6 below.

FIG. 5 shows text displayed on a liquid crystal display window of a mobile terminal in personal information receiving mode in accordance to the present invention.

Particularly, a mobile terminal corresponding to the phone number shown in FIG. 4E receives a short message including the personal information transmitted from the sending mobile terminal according to the procedure described with reference to FIG. 4A.about.4F. Here, the receiving mobile terminal which receives the short message determines if the short message has a "personal information identifier." If the short message has the "personal information identifier," the liquid crystal window of the receiving mobile terminal displays a receipt of the personal information and inquires if the user wishes to store the personal information. Here, the user may also be notified of the arrival of the short message through the speaker or buzzer of the receiving mobile terminal.

Upon receiving the short message including the personal information, if the user enters a command to store the personal information by, for example, pushing a "Save" key on the receiving mobile terminal, the received data is automatically added and stored into the telephone number list of the mobile terminal. On the other hand, if a command not to store the personal information is entered by, for example, pushing a "Cancel" key on the receiving mobile terminal, the received short message is deleted without storage.

Figure 6:
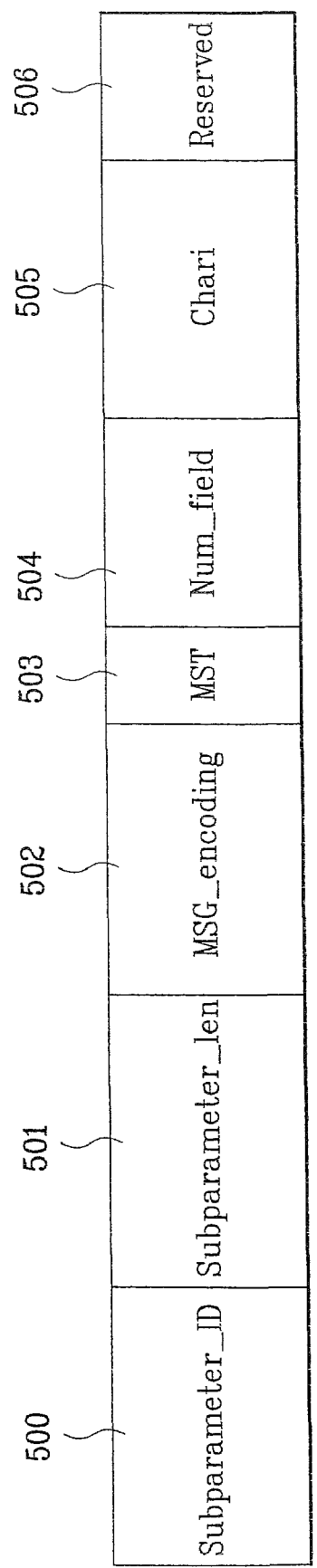
FIG. 6 shows a user data field of a short message according to the present invention.

FIG. 6 shows a user data field for a short message according to the present invention. The present user data field for a short message includes a subparameter_ID field 500 which is a subparameter identifier; a subparameter_len field 501 which indicates the length information of the short message other than the subparameter_ID field 500 and the subparameter_len field 501; a MSG_encoding field 502 which represents a coding type of the short message; a MST field 503 which indicates the type of the message such as broadcasting, point-to-point, or voice mail; a Num_field 504 which represents the character length Num_field by which value the data of Chari 505 is repeated. The Chari 505 is a user data field for SMS into which the "//piid" field can be inserted to distinguish a SMS for personal information transmission from other general short messages. For example, personal information may be inserted into Chari 505 in the form of "//piid name telephone number." Finally, the last field is a reserved field 506.

As described above, the method of sending and receiving the personal information using the mobile terminal in accordance to the present invention enables users to conveniently send personal information to other mobile terminal(s) or receive information from other mobile terminal(s). For example, business cards are exchanged during a business meeting and may be stored in the mobile terminal by hand. However, the present invention allows an exchange of such personal information conveniently by an on-line transmission and automatic storage of the personal information. Furthermore, variable information can also be stored in the mobile terminal when a mobile terminal is used for public activities during business.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of sending information using a mobile device, comprising:
receiving a selection of a first menu option displayed on a first mobile terminal, the first menu option for inputting a first set of contact information;
displaying a first screen for inputting the first set of contact information;
receiving a selection of a second menu option for transmitting contact information;
displaying a second screen for inputting a second set of contact information, and receiving the second set of contact information, the second set of contact information corresponding to a second mobile terminal;
displaying a message, the message including the first set of contact information as content of the message and the second set of contact information as a receiver information of the message; and
transmitting the message to the second mobile terminal based on the second set of contact information, wherein the first and second menu options are selected from a menu associated with a phone number list of the first mobile terminal, and wherein the first set of contact information comprises at least one item of contact information corresponding to each of a plurality of contact parties or a plurality of items of contact information corresponding to one contact party.

2. The method of claim 1, wherein the second set of contact information is at least one of a contact entry stored in the first mobile terminal, or a phone number, facsimile number, or email address input at the first mobile terminal.

3. The method of claim 1, wherein the second set of contact information corresponding to the second mobile terminal is provided by accessing a phone number using the phone number list stored in the first mobile terminal.

4. The method of claim 1, wherein the first set of contact information is at least one of a name, a phone number, an address, a business name, an email address or a facsimile number.

5. A method of sending information using a mobile device, comprising:
receiving a selection of a first menu option displayed on a terminal having a first mobile number, the first menu option for inputting a first set of contact information;
displaying a first screen for inputting the first set of contact information;
receiving a selection of a second menu option on the terminal having the first mobile number, the second menu option for transmitting contact information;
displaying a second screen for inputting a second set of contact information, and receiving the second set of contact information, the second set of contact information corresponding to a terminal having a second mobile number;
displaying a message, the message including the first set of contact information as content of the message and the second set of contact information as a receiver information of the message;
transmitting the message to the terminal having the second mobile number based on the second set of contact information;
receiving the message including the first set of contact information as the content of the message at the terminal having the second mobile number;
displaying the first set of contact information on a screen of the terminal having the second mobile number; and
storing the first set of contact information in a contact list of the terminal having the second mobile number, wherein the first and second menu options are selected from a menu associated with a phone number list of the terminal having the first mobile number.

6. A method of sending information using a mobile device, comprising:
receiving a selection of a first menu option displayed on a first mobile terminal, the first menu option for inputting a first set of contact information;
displaying a first screen for inputting the first set of contact information;
receiving a selection of a second menu option for transmitting contact information;
displaying a second screen for inputting a plurality of second sets of contact information, and receiving the plurality of second sets of contact information, the plurality of second sets of contact information corresponding to a plurality of second mobile terminals;
displaying a message, the message including the first set of contact information as content of the message and the plurality of second sets of contact information as a plurality of receiver informations of the message; and
transmitting the message to the plurality of second mobile terminals based on the plurality of second sets of contact information, wherein the first and second menu options are selected from a menu associated with a phone number list of the first mobile terminal, and wherein the first set of contact information comprises at least one item of contact information corresponding to each of a plurality of contact parties or a plurality of items of contact information corresponding to one contact party.

7. A method of sending information using a mobile device, comprising:
- receiving a selection of a first menu option displayed on a first mobile terminal, the first menu option for inputting content of a message;
- displaying a first screen for inputting the content of the message;
- receiving a selection of a second menu option for transmitting contact information;
- displaying a second screen for inputting a plurality of second sets of contact information, and receiving the plurality of second sets of contact information, the plurality of second sets of contact information corresponding to a plurality of second mobile terminals;
- displaying a message, the message including the inputted content as content of the message and the plurality of second sets of contact information as a plurality of receiver informations of the message; and
- transmitting the message to the plurality of second mobile terminals based on the plurality of second sets of contact information, wherein the second menu option is selected from a menu associated with a phone number list of the first mobile terminal.

8. A method of sending information using a mobile device, comprising:
- receiving a selection of a first menu option displayed on a first mobile terminal, the first menu option for inputting a first set of contact information;
- displaying a first screen for inputting the first set of contact information;
- receiving a selection of a second menu option for transmitting contact information;
- displaying a second screen for inputting a second set of contact information, and receiving the second set of contact information, the second set of contact information corresponding to a second mobile terminal;
- receiving a selection of a third menu option for transmitting contact information;
- displaying a third screen for inputting a third set of contact information, and receiving the third set of contact information, the third set of contact information corresponding to a third mobile terminal;
- displaying a message, the message including the first set of contact information as content of the message, the second set of contact information as a first receiver information of the message and the third set of contact information as a second receiver information of the message; and
- transmitting the message to the second and third mobile terminals based on the second and third sets of contact information, respectively, wherein the first, second and third menu options are selected from a menu associated with a phone number list of the first mobile terminal, and wherein the first set of contact information comprises at least one item of contact information corresponding to each of a plurality of contact parties or a plurality of items of contact information corresponding to one contact party.

9. A method of sending information using a mobile device, comprising:
- displaying, on a first mobile terminal, a first menu option and an editing menu option together, the first menu option for inputting a first set of contact information and the editing menu option for editing the first set of contact information;
- receiving a selection of the first menu option displayed on the first mobile terminal;
- displaying a first screen for inputting the first set of contact information;
- receiving a selection of a second menu option displayed on the first mobile terminal, the second menu option for transmitting contact information;
- displaying a second screen for inputting a second set of contact information, and receiving the second set of contact information, the second set of contact information corresponding to a second mobile terminal;
- displaying a message, the message including the first set of contact information as content of the message and the second set of contact information as a receiver information of the message; and
- transmitting the message to the second mobile terminal based on the second set of contact information, wherein the first and second menu options are selected from a menu associated with a phone number list of the first mobile terminal, and wherein the first set of contact information comprises at least one item of contact information corresponding to each of a plurality of contact parties or a plurality of items of contact information corresponding to one contact party.

10. A method of sending information using a mobile device, comprising:
- receiving a selection of a first menu option displayed on a terminal having a first mobile number, the first menu option for inputting a first set of contact information;
- displaying a first screen for inputting the first set of contact information on the terminal having the first mobile number;
- receiving a selection of a second menu option on the terminal having the first mobile number, the second menu option for transmitting contact information;
- displaying a second screen for inputting a second set of contact information on the terminal having the first mobile number, and receiving the second set of contact information on the terminal having the first mobile number, the second set of contact information corresponding to a terminal having a second mobile number;
- displaying a message on the terminal having the first mobile number, the message including the first set of contact information as content of the message and the second set of contact information as a receiver information of the message;
- transmitting the message from the terminal having the first mobile number to the terminal having the second mobile number based on the second set of contact information;
- receiving the message including the first set of contact information as the content of the message at the terminal having the second mobile number;
- displaying distinguishably the message from another message not including contact information as a content of another message on the terminal having the second mobile number; and
- storing the first set of contact information in a contact list of the terminal having the second mobile number, wherein the first and second menu options are selected from a menu associated with a phone number list of the terminal having the first mobile number.

11. A mobile terminal comprising:
a screen;
a memory; and
a controller to select a first menu option displayed on the screen for inputting a first set of contact information, to select a second menu option displayed on the screen for inputting a second set of contact information and to display a message including the first set of contact information as content of the message and the second set of contact information as a receiver information of the message on the screen, wherein the massage is transmitted to another mobile terminal based on the second set of contact information, wherein the first and second menu options are selected from a menu associated with a phone number list of the mobile terminal, and wherein the first set of contact information comprises at least one item of contact information corresponding to each of a plurality of contact parties or a plurality of items of contact information corresponding to one contact party.

12. A mobile terminal comprising:
a screen;
a memory; and
a controller to display a first set of contact information included in a received message as a content of the message on the screen and store the first set of contact information in a contact list stored in the memory, wherein a mobile number of the mobile terminal is based on a second set of contact information included in the received message as a receiver information of the message, and wherein the first and second sets of contact information are included in the message using first and second menu options associated with a phone number list of another mobile terminal transmitting the message.

13. The mobile terminal of claim 12, wherein the controller displays distinguishably the message from another message not including contact information as a content of another message.

14. A mobile terminal comprising:
a screen;
a memory; and
a controller to select a first menu option displayed on the screen for inputting a first set of contact information, to select a second menu option displayed on the screen for inputting a plurality of second sets of contact information and to display a message including the first set of contact information as content of the message and the plurality of second sets of contact information as a plurality of receiver informations of the message on the screen,
wherein the massage is transmitted to a plurality of another mobile terminals based on the plurality of second sets of contact information, wherein the first and second menu options are selected from a menu associated with a phone number list of the mobile terminal, and wherein the first set of contact information comprises at least one item of contact information corresponding to each of a plurality of contact parties or a plurality of items of contact information corresponding to one contact party.

15. A mobile terminal comprising:
a screen;
a memory; and
a controller to select a first menu option displayed on the screen for inputting content of a message, to select a second menu option displayed on the screen for inputting a plurality of second sets of contact information and to display a message including the inputted content as content of the message and the plurality of second sets of contact information as a plurality of receiver informations of the message on the screen, wherein the massage is transmitted to a plurality of another mobile terminals based on the plurality of second sets of contact information, and wherein the second menu option is selected from a menu associated with a phone number list of the mobile terminal.

16. A first mobile terminal comprising:
a screen;
a memory; and
a controller to select a first menu option displayed on the screen for inputting a first set of contact information, to select a second menu option displayed on the screen for inputting a second set of contact information, to select a third menu option displayed on the screen for inputting a third set of contact information and to display a message including the first set of contact information as content of the message, the second set of contact information as a first receiver information of the message and the third set of contact information as a second receiver information of the message on the screen,
wherein the second set of contact information corresponds to a second mobile terminal and the third set of contact information corresponds to a third mobile terminal, wherein the massage is transmitted to the second and third mobile terminals based on the second and third sets of contact information, respectively, wherein the first, second and third menu options are selected from a menu associated with a phone number list of the mobile terminal, and
wherein the first set of contact information comprises at least one item of contact information corresponding to each of a plurality of contact parties or a plurality of items of contact information corresponding to one contact party.

17. A first mobile terminal comprising:
a screen;
a memory; and
a controller to display a first menu option for inputting a first set of contact information and an editing menu option for editing the first set of contact information together on the screen, to select the first menu option displayed on the screen, to select a second menu option displayed on the screen for inputting a second set of contact information and to display a message including the first set of contact information as content of the message and the second set of contact information as a receiver information of the message on the screen,
wherein the massage is transmitted to another mobile terminal based on the second set of contact information, wherein the first and second menu options are selected from a menu associated with a phone number list of the mobile terminal, and wherein the first set of contact information comprises at least one item of contact information corresponding to each of a plurality of contact parties or a plurality of items of contact information corresponding to one contact party.

* * * * *